(12) United States Patent
Siminou

(10) Patent No.: US 12,440,101 B2
(45) Date of Patent: Oct. 14, 2025

(54) PUPILOMETRY WITH LIGHT INTENSITY CALIBRATION

(71) Applicant: Neuroptics, Inc., Irvine, CA (US)

(72) Inventor: Kamran Siminou, Newport Coast, CA (US)

(73) Assignee: Neuroptics, Inc., Irvine, CA (US)

( * ) Notice: Subject to any disclaimer, the term of this patent is extended or adjusted under 35 U.S.C. 154(b) by 713 days.

(21) Appl. No.: 17/398,106

(22) Filed: Aug. 10, 2021

(65) Prior Publication Data

US 2022/0233072 A1 Jul. 28, 2022

Related U.S. Application Data

(63) Continuation of application No. PCT/US2020/018003, filed on Feb. 12, 2020.

(60) Provisional application No. 62/804,467, filed on Feb. 12, 2019.

(51) Int. Cl.
| | |
|---|---|
| *A61B 3/10* | (2006.01) |
| *A61B 3/00* | (2006.01) |
| *A61B 3/02* | (2006.01) |
| *A61B 3/024* | (2006.01) |
| *A61B 3/12* | (2006.01) |
| *A61B 3/14* | (2006.01) |

(52) U.S. Cl.
CPC .............. *A61B 3/14* (2013.01); *A61B 3/0008* (2013.01); *A61B 3/0041* (2013.01); *A61B 2560/0431* (2013.01)

(58) Field of Classification Search
CPC ......... A61B 3/1025; A61B 3/02; A61B 3/102; A61B 3/113; A61B 3/1015; A61B 3/1225; A61B 3/024; A61B 3/032; A61B 3/005; A61B 3/0285; A61B 3/1208; A61B 3/00; A61B 3/103; G02C 13/005
USPC ....... 351/206, 200, 205, 209, 210, 221–223, 351/243, 245, 246
See application file for complete search history.

(56) References Cited

U.S. PATENT DOCUMENTS

| | | | | |
|---|---|---|---|---|
| 5,329,322 | A * | 7/1994 | Yancey | A61B 3/103 |
| | | | | 351/221 |
| 9,498,125 | B2 * | 11/2016 | Caraffi | A61B 3/113 |
| 11,576,575 | B2 * | 2/2023 | Milea | A61B 3/14 |
| 2015/0045012 | A1 * | 2/2015 | Siminou | H04M 1/724092 |
| | | | | 455/419 |
| 2016/0262611 | A1 * | 9/2016 | Rotenstreich | A61B 3/0025 |
| 2017/0100061 | A1 * | 4/2017 | Finkel | A61B 5/1107 |
| 2018/0133504 | A1 * | 5/2018 | Malchano | A61B 5/378 |

* cited by examiner

*Primary Examiner* — Dawayne Pinkney
(74) *Attorney, Agent, or Firm* — Hybrid Law Group P.C.

(57) ABSTRACT

A method of examining a response from one or more pupils of an eye is described. The method includes providing a hand-held mobile device with a display, a built-in camera, and a light stimulus source, wherein the light stimulus source can emit light at various intensities; using the mobile device to locate the pupil; using the mobile device to determine a distance between the device and the pupil; applying an algorithm that calculates a specific or optimal light intensity based on the distance between the device and the eye and causes the light stimulus source to emit one or more flashes of light at the specific or optimal light intensity; using the built-in camera to record the response of the pupil to the one or more flashes of light; and displaying on the display the data representative of the response of the pupil to the one or more flashes of light.

9 Claims, No Drawings

PUPILOMETRY WITH LIGHT INTENSITY CALIBRATION

FIELD OF THE INVENTION

This application is a bypass continuation of International Application PCT/US2020/018003, entitled PUPILOMETRY WITH LIGHT INTENSITY CALIBRATION, filed Feb. 12, 2020 which claims the benefit of U.S. Provisional Patent Application Ser. No. 62/804,467, entitled PUPILOMETRY WITH LIGHT INTENSITY CALIBRATION, filed Feb. 12, 2019.

All of the above-mentioned patent applications are hereby incorporated by reference in their entirety as if fully set forth herein.

BACKGROUND OF THE INVENTION

The present invention relates generally to pupilometers and pupilometry devices, systems and methods, including hand-held mobile devices containing pupilometry applications and capabilities. More particularly, it relates to devices and methods in which the light intensity can be calibrated to apply a consistent amount of light intensity to the eye.

Systems for monitoring pupil size and pupil responsiveness characteristics are well known in the art and are generally referred to as pupilometry systems or, simply, pupilometers. Examples of hand-held pupilometers can be found in U.S. Pat. Nos. 9,402,542, 8,393,734, and 9,198,570, all of which are incorporate herein by reference.

Pupilometers have become an important aspect of patient care in recent years as the medical community has come to understand that accurate, reliable and objective reactivity data independent of examiner is achievable and critical to accurate diagnosis and treatment of patients. The Neuroptics NPi®-200 Pupilometer is an example of a state of the art pupilometer that is increasingly used in hospitals and doctors' offices for patient care. Such professional grade, state of the art pupilometers have the appropriate components to ensure the correct, precise and consistent amount of light intensity is delivered to the eye during each measurement to capture accurate pupil responsiveness data. However, new pupilometry devices that aren't specifically for pupilometry but may be multi-purpose devices or smart-phones do not have such capabilities. For these multi-purpose hand-held mobile devices, pupilometry apps have been designed and are available for personal or commercial use, but their accuracy and reliability is hindered by various deficiencies. One of those deficiencies is that these devices are not able to calibrate, standardize and deliver a precise and consistent light intensity to a pupil at each delivery.

They are incapable of delivering a consistent intensity of light to the pupil, which makes accurate and reliable measurement of pupillary response difficult or impossible.

The present invention solves this problem, which prevents multi-purpose mobile devices from being able to provide accurate, reliable data to clinicians and medical providers.

SUMMARY OF THE INVENTION

In one particularly innovative aspect, a method of examining a response from one or more pupils of an eye is described. The method includes providing a hand-held mobile device with a display, a built-in camera, and a light stimulus source, wherein the light stimulus source can emit light at various intensities; using the mobile device to locate the pupil; using the mobile device to determine a distance between the device and the eye; applying an algorithm that calculates an optimal or specific light intensity based on the distance between the device and the eye and causes the light stimulus source to emit one or more flashes of light at the optimal light intensity; using the built-in camera to record the response of the pupil to the one or more flashes of light; and displaying on the display the data representative of the response of the pupil to the one or more flashes of light. The algorithm can be incorporated into the hand-held mobile device as a mobile application. In an alternative embodiment, the light stimulus emits light at the specific intensity over a period of time rather than as a flash.

In another innovative aspect, a hand-held mobile device for examining a response from a pupil of an eye of a subject is provided. The hand-held device has a camera with means for locating a pupil of a subject. The device also has means for determining a distance from the device to the eye of the subject. The device further includes a central processing unit with a memory having an image or video processing algorithm for processing images or video recorded by the camera and an algorithm for adjusting the intensity of light emitted by the light stimulus source. The hand-held device further has a light stimulus source capable of emitting light at various intensities determined by the algorithm, and a display capable of displaying data representing a response of the pupil to one or more flashes of light from the light stimulus source. The algorithm can calculate the optimum or specific light intensity based on the distance from the device to the eye and send a corresponding signal or command to the light stimulus source that adjusts the intensity of the light to the optimal or specific intensity calculated by the algorithm, thus causing the light source to emit light at that specific or optimum intensity. Alternatively, or additionally, the algorithm can calculate the optimum or specific light intensity based on the intensity of reflections of light reflected by the cornea. In this embodiment, the device has one or more light sources that emit a dummy light at a known intensity, and the camera can detect the light reflected from the cornea and measure its intensity. In one embodiment, the algorithm compares the intensity of the light reflected by the cornea to the intensity of the light emitted by the device and adjusts the intensity of the light stimulus source to emit a light at a specific or optimum intensity. In another embodiment, the algorithm adjusts the intensity of the light stimulus source based on the intensity of the reflected light from the cornea. The one or more light sources can be LEDs that emit IR light that does not stimulate the pupil or white light or other light that can stimulate the pupil.

In yet another innovative aspect, a computer program product embodied in a non-transitory computer-readable storage medium and having a computer-executable instructions recorded on said storage medium for performing a method is provided. The method includes causing a camera of a mobile device to locate a pupil of an eye within a field of view of said camera; causing the mobile device to determine the distance between it and the pupil; causing the mobile device to adjust a light stimulus source on the mobile device to emit light at a specific intensity determined by the distance between the mobile device and the pupil, such that the greater the distance between the mobile device and the pupil, the greater the light intensity emitted by the light stimulus source, and the shorter the distance between the mobile device and the pupil, the lower the light intensity emitted by the light stimulus source; causing the mobile device to begin recording a video of the pupil a short duration before causing the light source to emit a flash of light at the specific intensity; and causing the mobile device to process images of the pupil and deliver an output on the display of the mobile device representing the response of the pupil to the flash of light.

In yet another innovative aspect, a computer program product embodied in a non-transitory computer-readable storage medium and having a computer-executable instructions recorded on said storage medium for performing a method is provided. The method includes causing a camera of a mobile device to locate a pupil of an eye within a field of view of said camera; causing the mobile device to emit a first light to the eye; causing the mobile device to detect the intensity of the reflection of said first light from the eye; causing the mobile device to adjust a light stimulus source on the mobile device to emit a second light at a specific intensity determined by the intensity of the reflection of the first light, such that the greater the intensity of the reflection of the first light, the lower the light intensity of the second light emitted by the light stimulus source, and the lower the intensity of the reflection of the first light, the greater the intensity of the second light emitted by the light stimulus source; causing the mobile device to begin recording a video of the pupil a short duration before or simultaneously with causing the light source to emit the second light at the optimal intensity; and causing the mobile device to process images of the pupil and deliver an output on the display of the mobile device representing the response of the pupil to the second light. In one embodiment, the first light is an IR light that does not stimulate the pupil. In another embodiment, the first light is a flash of light that is emitted by the light stimulus source at a known intensity. In one embodiment, the first light reflects off of the cornea of the eye and the reflection is a Perkinje reflection or multiple Perkinje reflections, which may be one, two, three or more Perkinje reflections.

In another innovative aspect, a method of examining a response from one or more pupils of an eye is described. The method includes providing a hand-held mobile device with a display, a built-in camera, and a light stimulus source, wherein the light stimulus source can emit light at various intensities; using the mobile device to locate the pupil; using the mobile device to calibrate the light stimulus source automatically to a specific light intensity; causing the light stimulus source to emit light at the specific light intensity; using the built-in camera to record the response of the pupil to emitted light; and displaying on the display the data representative of the response of the pupil to the light. In one embodiment, the light stimulus source is automatically calibrated based on a determination made by the hand-held device of the distance between the device and the eye.

Other objects and features of the present invention will become apparent from consideration of the following description taken in conjunction with the accompanying drawings.

DETAILED DESCRIPTION

In any kind of pupilometry application, whether it is a high-tech dedicated pupilometer or a pupilometry mobile device application, the output of the instrument relies heavily on the delivery of a consistent and known input. In the case of pupilometry, the input is typically a flash of light directed at the eye/pupil of a patient. The output of the pupilometer or mobile device is a representation, whether numerical, graphical or pure data, of the pupil's response to that flash of light. Physiologically, the response of the pupil relies on the intensity of the light that reaches it. Thus, the output issued by the instrument depends on the intensity of the light that reaches the pupil. In order for a pupilometer or mobile device to provide an accurate and reliable output, the input must be known and consistent. In other words, the intensity of the light that reaches the eye must be a known constant, otherwise the results will include variabilities that will not be an accurate reflection of the condition of the patient.

Pupilometers are well known and some of them have been described and incorporated herein by reference, such as those described in U.S. Pat. Nos. 9,402,542, 8,393,734, and 9,198,570. These earlier devices have largely been dedicated pupilometers with hardware and software components that make them ideal for pupilometry applications, and they are not multi-purpose devices that do other things, such as mobile phones or tablet devices. They are specialized instruments that are designed specifically for pupilometry. For example, the Neuroptics NPi®-200, incorporated herein by reference, is a precision instrument that is designed to provide accurate measurements of pupillary responses. This means that the stimulus input is calibrated and consistent so that the output in terms of the measured results can be accurate and consistent. Dedicated pupilometers are able to address the issue of consistent light input by always providing the same intensity of light in a light flash and by making sure that the intensity of light that reaches the pupil is always the same. This consistency is typically achieved by setting the light intensity at a known intensity and by attaching a headrest to the pupilometer with a known length so that the distance from the light source to the pupil is always the same. By setting a standard or constant for those two parameters, the light intensity that reaches the eye can be known, consistent and precise.

Mobile devices as used herein include cell phones, mobile tablets, mobile pupilometers, mobile pupilometry devices, and the like, which have built-in cameras that can locate a pupil within an image of an eye. Mobile device apps that have pupil identification and location capability are known in the art.

With newer devices that purport to provide pupilometry capabilities, including mobile devices, this consistency in the intensity of light reaching the eye is not possible. That's because at least one of the two variables that determine the intensity of the light that reaches the eye cannot be controlled with precision, namely the distance between the light source and the eye. With cell phones, for example, it is not possible to precisely control the distance between the light source on the cell phone and the patient's eye or to determine the intensity of light that reaches the eye irrespective of the distance.

The user may hold the mobile device at almost any distance from the eye with even slight variations causing inconsistent, uncontrolled, and imprecise results. This variability in distance means variability in the intensity of light reaching the pupil, and that variability results in variability in the output of the mobile device, leading to inaccurate, unreliable or unhelpful results. Thus, cell phones with pupilometry applications are not particularly useful for patient care in healthcare setting where precision and accuracy are critical, because they cannot provide accurate data and output.

The present invention solves this problem associated with mobile device pupilometry by providing a means to determine the distance between the light source and the eye or a means to determine the amount of light reaching the eye at any intensity of light emitted and to automatically alter or modulate the intensity of the light source accordingly so that a known and consistent intensity of light reaches the pupil/eye each time.

The intensity of light changes (1/d) d=distance. For example, if the mobile device light source is 2" away from the eye vs. 4" away from the eye, the intensity of the light reaching the eye will drop by approximately 50%.

The present invention provides pupillometers, pupilometry devices, and mobile device pupilometry applications which are able to determine the distance between the light source and the eye. That distance is communicated to the central processing unit of the pupilometer, pupilometry device or mobile device, and the CPU causes the light source of the device to adjust the light intensity that it emits accordingly. Once the correct light intensity is determined, the light source emits the flash of light at that intensity to compensate for the difference in distance to the eye.

Provided herein are pupilometers, pupilometry devices or mobile device pupilometry applications that can measure the distance between the light source on the device and the eye. This can be done in a number of ways, the following of which are examples. One way is to incorporate an auto-focus lens into the camera of the device, in which the back focal length from the lens to the imager can be used to calculate the distance to the object (eye). Another way to calibrate or adjust the intensity of the light emitted by the light stimulus source that is used to stimulate the pupil is to measure the diameter of the iris of the eye by measuring the sclera/iris border and assume an average diameter for the iris and based on that calculate the distance between the camera (where the light source is) and the eye. Yet another way is to incorporate a range finder into the device and use it to determine the distance. Once the distance is determined, the light stimulus is automatically adjusted to deliver a precise, consistent and known intensity of light to the pupil of the eye.

Another way to calibrate or adjust the intensity of the light emitted by the light stimulus source that is used to stimulate the pupil is to use two LEDs in the device, to use the device camera to identify the Perkinje reflection of those LEDs in the eye and to use that data to calculate the distance from the LEDs (where the main flash light source is) and the eye. The device camera is designed to calculate the distance between the Perkinje reflections, and triangulate the distance of the device (or any component of the device, such as the camera lens or LEDs) to the eye.

In another embodiment, the intensity of Perkinje reflections, rather than their distance from one another, is used to calibrate or adjust the intensity of the light emitted by the light stimulus source that is used to stimulate the pupil. The method includes (i) emitting a first light (a dummy light) of a known intensity from the light stimulus source or from a second light source, such as an IR light source; (ii) identify the Perkinje reflection(s) and measure the intensity of those reflection(s); (iii) automatically adjusting the light intensity of the light stimulus source based on the intensity of the Perkinje reflections; and (iv) emitting a second light from the light stimulus source, the second light being the stimulus light that has been automatically adjusted. The light stimulus source can be the source of both the first light that elicits Perkinje reflection(s) and the second light that stimulates the pupil. Thus, the intensity of the light stimulus source is calibrated using Perkinje reflections. In one embodiment, the Perkinje reflections can be elicited using IR light or a light source that is separate from the light stimulus source that is used to examine the response of the pupil to light stimulus. In other words, the device may have more than one light source: one for eliciting Perkinje reflections, and a second one to stimulate the pupil, and the light source that elicits the Perkinje reflections may be an IR light source that does not stimulate the pupil, or it can be a stimulatory light source, such as a light source that emits white light.

Also provided herein are pupilometers, and mobile device applications that adjust the intensity of the stimulus light based on the distance between the light source on the device and the eye/pupil. The device contains an algorithm to adjust the intensity of the light source so that a known and constant light intensity reaches the eye. For example, assuming that intensity y is the standard desired intensity for reaching the eye and distance x achieves that intensity given the strength of the light stimulus source. If the distance is determined to be 2x between the light stimulus source and the eye/pupil, then the intensity of the flash of light is increased so that the intensity of the light that reaches the eye/pupil is still intensity y and not y/2.

Also provided herein are pupilometers and mobile devices that include ambient light sensors or other means for determining the level of ambient light in the vicinity of the device, which is in the vicinity of the subject's eye to be measured. Such a pupilometer or a mobile device application can have an algorithm that alters the intensity of the light stimulus based on the level of ambient light and on the distance between the device and the eye. Thus, in one embodiment, the pupilometer has a CPU with an algorithm that has an input representing the level of ambient light and another input representing the distance between the device and the eye of the patient, and an output for selecting the light intensity to be emitted by the device's light stimulus source. For example, the algorithm causes the CPU to signal the light stimulus source to emit a higher intensity flash of light if the distance between the device and the eye is greater than a pre-determined ideal distance and flash intensity or if the ambient light level is higher than a pre-determined ideal ambient light level or if both conditions are true. In another example, the algorithm causes the CPU to signal the light stimulus source to emit a lower intensity flash of light if the distance between the device and the eye is less than a pre-determined ideal distance and flash intensity or if the ambient light level is lower than a pre-determined ideal ambient light level or if both conditions are true.

Also described herein is a method of using a pupilometer or mobile device with a pupilometry application to measure the reaction of a pupil to a light stimulus. The first step is to hold the device a distance from the eye, bring the pupil into the focus of the camera in the device so that the camera is able to identify the pupil, determine the distance between the light source on the device and the pupil, adjust the light intensity of the light source based on the distance between the light source and the pupil, deliver a flash of light at that said intensity to the pupil, record the reaction of the pupil to that flash of light, and provide an output representing the reaction of the pupil to that flash of light. The output can be raw data describing the pupil's reaction, such as constriction size, constriction velocity, latency, or any of the pupillary response data described in U.S. Pat. Nos. 9,402,542, 8,393, 734, and 9,198,570. The output can also be a graphical output showing the pupil's response over time, or it can also be an alphanumeric or other output indicative of the neurological or other health condition of the patient based on the pupillary response. The step of determining the distance between the light source and the pupil can be performed in any of the ways described above or other ways not described herein. In one embodiment, Perkinje reflections are used to calibrate or adjust the intensity of the light emitted by the light stimulus source that is used to stimulate the pupil. The method includes (i) emitting a first light (a dummy light) of a known intensity from the light stimulus source or from a second light source, such as an IR light source; (ii) using the camera to identify the distance between the Perkinje reflections; (iii) triangulating the distance from the device to the eye (the device being any aspect of the device, such as the lense, the LEDs, or any known point on the device); and (iv) adjusting or calibrating the intensity of the light stimulus source to deliver a calibrated or adjusted intensity of light to the pupil. Alternatively, the camera can identify the Perkinje reflections and measure the intensity of those reflections and adjust the light intensity of the light stimulus source based on the intensity of the Perkinje reflections. Once the distance is calculated by the device using the Perkinje reflections from the emission of the dummy light, the method includes emitting a second light from the light stimulus source, the second light being the stimulus light that has been automatically adjusted. The method can also include the step of providing a database with normative pupil response data or abnormal pupil response data associated with a given and known standardized light intensity that reaches an eye. That known standardized light intensity is the intensity that the device achieves by using the method described here. In an additional step, the reaction of the pupil is compared to the normative or abnormal data in the database to provide an output. The database can be in the memory of the device or it can be stored in a remote location such as in cloud storage.

While the invention is susceptible to various modifications and alternative forms, specific examples thereof have been shown by way of example in the drawings and are herein described in detail. It should be understood, however, that the invention is not to be limited to the particular forms or methods disclosed, but to the contrary, the invention is to cover all modifications, equivalents, and alternatives falling within the spirit and scope of the appended claims.

I claim:

1. A method of examining a response of one or more pupils of an eye, comprising:
   providing a hand-held pupilometer comprising a display, a built-in camera, a central processing unit with a memory comprising an algorithm and a light stimulus source, wherein the light stimulus source can emit light at various intensities;
   using the pupilometer to locate the pupil;
   using the pupilometer to determine a distance between the pupilometer and the eye by:
      emitting a first light of known intensity to the eye;
      identifying at least two Perkinje reflections from the eye; and
      calculating the distance between the at least two Perkinje reflections to calculate the distance between the pupilometer and the eye;
   applying the algorithm to calculate a specific light intensity based on the distance between the pupilometer and the eye and cause the light stimulus source to emit one or more flashes of light at said specific light intensity;
   using the built-in camera to record the response of the pupil to the one or more flashes of light; and
   displaying on the display data representative of constriction, dilation or shape response of the pupil to the one or more flashes of light.

2. The method of claim 1, wherein the pupilometer contains an ambient light sensor, and wherein the method further comprises the steps of:
   using the ambient light sensor to determine the level of ambient light surrounding the pupilometer;
   applying an algorithm that calculates the specific light intensity based additionally on the level of ambient light and causes the light stimulus source to emit one or more flashes of light at the specific light intensity.

3. A hand-held pupilometer for examining a response from a pupil of an eye of a subject, comprising:
   a light stimulus source capable of emitting light at various intensities;
   a camera with means for locating a pupil of a subject;
   means for determining a distance from the pupilometer to the eye of the subject by emitting a first light of known intensity to the eye by the light stimulus source, identifying at least two Perkinje reflections from the eye with the camera, and calculating the distance between the at least two Perkinje reflections to calculate the distance between the pupilometer and the eye;
   a central processing unit with a memory comprising an image or video processing algorithm for processing images or video recorded by the camera and an algorithm for automatically adjusting the intensity of light emitted by the light stimulus source based on the distance between the device and the eye; and
   a display capable of displaying data representing dilation, constriction or shape response of the pupil to one or more flashes of light from the light stimulus source.

4. A computer program product embodied in a non-transitory computer-readable storage medium and having a computer-executable instructions recorded on said storage medium for performing a method comprising:
   causing a camera of a hand-held pupilometer to locate a pupil of an eye within a field of view of said camera;
   causing the pupilometer to determine the distance between it and the eye, wherein the distance between the pupilometer and the eye is determined by causing the light stimulus source of the mobile device to emit a dummy light of known intensity to the eye; causing the camera to identify two or more Perkinje reflections from the eye; causing the pupilometer to calculate the distance between the at least two Perkinje reflections; and causing a microprocessor of the pupilometer to calculate the distance between the device and the eye based on the distance between the two or more Perkinje reflections;
   causing the pupilometer to adjust a light stimulus source on the pupilometer to emit light at a specific intensity based on the distance between the pupilometer and the eye, such that the greater the distance between the pupilometer and the eye, the greater the light intensity emitted by the light stimulus source, and the shorter the distance between the pupilometer and the eye, the lower the light intensity emitted by the light stimulus source;
   causing the pupilometer to begin recording a video of the pupil a short duration before or simultaneously with causing the light source to emit a flash of light at the specific intensity; and
   causing the pupilometer to process images of the pupil and deliver an output on the display of the pupilometer representing constriction, dilation or shape response of the pupil to the flash of light.

5. The computer program product of claim 4, wherein the step of causing the pupilometer to emit light at a specific intensity is determined by at least two factors: (i) the distance between the pupilometer and the eye; and (ii) the level of ambient light surrounding the pupilometer.

6. A computer program product embodied in a non-transitory computer-readable storage medium and having a computer-executable instructions recorded on said storage medium for performing a method comprising:

causing a camera of a hand-held pupilometer to locate a pupil of an eye within a field of view of said camera;

causing the pupilometer to emit a first light to the eye, wherein said first light reflects off of the cornea off of the cornea of the eye and the reflection is a Perkinje reflection;

causing the pupilometer to detect the intensity of the reflection of said first light from the eye;

causing the pupilometer to adjust a light stimulus source on the pupilometer to emit a second light at a specific intensity determined by the intensity of the reflection of the first light, such that the greater the intensity of the reflection of the first light, the lower the light intensity of the second light emitted by the light stimulus source, and the lower the intensity of the reflection of the first light, the greater the intensity of the second light emitted by the light stimulus source;

causing the pupilometer to begin recording a video of the pupil a short duration before or simultaneously with causing the light source to emit the second light; and causing the pupilometer to process images of the pupil and deliver an output on the display of the pupilometer representing constriction, dilation, or shape response of the pupil to the second light.

7. The computer program product of claim 6, wherein first light is IR light that does not stimulate the pupil.

8. The computer program product of claim 6, wherein the first light is a flash of light that is emitted by the light stimulus source at a known intensity.

9. A hand-held pupilometer comprising a computer program product embodied in a non-transitory computer-readable storage medium and having a computer-executable instructions recorded on said storage medium for performing a method comprising:

causing a camera of a hand-held pupilometer to locate a pupil of an eye within a field of view of said camera;

causing the pupilometer to determine the distance between it and the eye, wherein the distance between the pupilometer and the eye is determined by causing the light stimulus source of the mobile device to emit a dummy light of known intensity to the eye; causing the camera to identify two or more Perkinje reflections from the eye; causing the pupilometer to calculate the distance between the at least two Perkinje reflections; and causing a microprocessor of the pupilometer to calculate the distance between the device and the eye based on the distance between the two or more Perkinje reflections;

causing the pupilometer to adjust a light stimulus source on the pupilometer to emit light at a specific intensity based on the distance between the pupilometer and the eye, such that the greater the distance between the pupilometer and the eye, the greater the light intensity emitted by the light stimulus source, and the shorter the distance between the pupilometer and the eye, the lower the light intensity emitted by the light stimulus source;

causing the pupilometer to begin recording a video of the pupil a short duration before or simultaneously with causing the light source to emit a flash of light at the specific intensity; and causing the pupilometer to process images of the pupil and deliver an output on the display of the pupilometer representing constriction, dilation or shape response of the pupil to the flash of light.

\* \* \* \* \*